United States Patent [19]

Zloof

[11] Patent Number: 5,489,922
[45] Date of Patent: Feb. 6, 1996

[54] HAND WORN REMOTE COMPUTER MOUSE

[75] Inventor: Moshe M. Zloof, Los Altos, Calif.

[73] Assignee: Hewlett-Packard Company, Palo Alto, Calif.

[21] Appl. No.: 322,961

[22] Filed: Oct. 13, 1994

Related U.S. Application Data

[63] Continuation of Ser. No. 163,961, Dec. 8, 1993, abandoned.

[51] Int. Cl.⁶ ........................................ G09G 5/00
[52] U.S. Cl. ...................... 345/156; 345/157; 345/158
[58] Field of Search ..................... 345/157, 156, 345/158; 273/148 B; 200/5 A, 52 R; 74/491, 469, 523; 341/21

[56] References Cited

U.S. PATENT DOCUMENTS

| | | | |
|---|---|---|---|
| 4,538,476 | 9/1985 | Luque | 74/471 |
| 4,578,674 | 3/1986 | Baker et al. | 345/156 |
| 4,682,159 | 7/1987 | Davison | 340/709 |
| 4,721,308 | 1/1988 | Trimble | 273/148 B |
| 4,862,172 | 8/1989 | Ross | 341/157 |
| 4,909,514 | 3/1990 | Tano | 273/148 B |
| 4,954,817 | 9/1990 | Levine | 340/706 |
| 4,988,981 | 1/1991 | Zimmerman et al. | 345/156 |
| 5,144,594 | 9/1992 | Gilchrist | 345/156 |
| 5,175,534 | 12/1992 | Thatcher | 345/156 |

FOREIGN PATENT DOCUMENTS

| | | | |
|---|---|---|---|
| 8706733 | 11/1987 | WIPO | H03M 11/00 |
| 9107826 | 5/1991 | WIPO | G05G 9/02 |

OTHER PUBLICATIONS

"Drawing Pen for Free Space Cursor/Pointer Device" IBM Technical Disclosure Bulletin, vol. 32, No. 10A Mar. 90.
"Remote Key Input to Personal Computer" IBM Technical Disclosure Bulletin, vol. 29, No. 9, Feb. 1987.

*Primary Examiner*—Ulysses Weldon
*Assistant Examiner*—Amare Mengistu

[57] ABSTRACT

A computer interface system that is worn on the middle fingers of both hands of the computer operator for controlling cursor movement is disclosed. The system includes a left and right hand fixed inner ring, the inner rings being of a dimension suitable to be worn on a portion of the middle fingers of the computer operator, and a left and a right rotatable outer ring. The system includes sensing elements disposed between each of the corresponding inner and outer rings for producing horizontal movement signals in response to the rotation of the left outer ring in relation to the left inner ring, and for producing vertical movement signals in response to the rotation of the right outer ring in relation to the right inner ring. The system also includes a pressure sensitive element disposed between corresponding inner and outer rings that produces an entry signal in response to the application of pressure on the outer ring toward the inner ring.

19 Claims, 3 Drawing Sheets

HAND WORN REMOTE COMPUTER MOUSE

CROSS REFERENCE TO RELATED APPLICATION

This is a continuation of application Ser. No. 08/163,961 filed on Dec. 8, 1993, now abandoned.

FIELD OF THE INVENTION

This invention relates to a graphic interface device for computers, and more particularly to a graphic interface device for computers that is worn on the computer keyboard operator's fingers and emulates the operation of a computer mouse.

BACKGROUND OF THE INTENTION

It is known in the field of computers to utilize remote computer interface devices that are hand-operated and physically separate from the keyboard. A well-known computer interface device is commonly known as the computer mouse, wherein the mouse is moved by hand over a planar work surface to move a cursor on the computer monitor. Many mouse-type devices have a small ball inside the mouse, which protrudes slightly from the bottom surface of the mouse. The ball rolls along the planar work surface, requiring a certain amount of frictional contact between the ball and the work surface. The mouse also typically includes an electrical switch that can be activated when the cursor is in a desired location in order to cause an entry in the computer.

A problem with the mouse-type devices is that the mouse is used in connection with a keyboard for data input. As a result, the user must repeatedly move his hand between the keyboard and the computer mouse work surface. The hand movement of the computer operator consumes non-productive time during the movement of the hand. The hand movement required for the operation of the computer mouse is both inefficient and tiring to the user. Therefore, a need exists for a mouse-type computer interface device that does not require the user to move his hand from the keyboard to a remote location in order to control the computer mouse and therefore expedites data entry.

Another problem with conventional mouse-type devices is that the required movement of the user's hands from the keys to the mouse interrupts the user's thought process. Moreover, the user's brain is required to mentally adjust from the vertical directional orientation of the keyboard to the horizontal orientation on the mouse. Therefore, a need exists for a computer mouse that does not require the user's thought process to be interrupted when the user activates the computer mouse.

Computers are also being used for a wider spectrum of applications. With increased computer applications, an increased need for a variety of computer mouse devices has evolved. For example, increased use of computer mouses, together with more compact computers, has created a need for a compact computer mouse-type device that is within easy access of the computer operator when the operator's hands are located on the computer keyboard. Also, recent developments in television technology have increased the need for user-friendly remote control devices. Therefore, a need exists for a remotely operated mouse-type device that is compact, lightweight, and does not require an additional work surface for use.

SUMMARY OF THE INVENTION

One object of the present invention is to provide a computer interface device that is worn on the hands of the computer keyboard operator.

Another object of the present invention is to provide a computer interface device that is operated remotely from the computer.

A further object of the present invention is to provide a computer interface device that does not require a separate planar work surface.

Another object of the present invention is to provide a computer interface device that is compact.

A still further object of the invention is to provide a computer interface device that does not interfere with the keyboard operator's hand movements near the keyboard.

Still another object of the present invention is to provide a computer interface device that expedites data entry.

Yet another object of the invention is to provide a computer interface device that is lightweight.

Still another object of the invention is to provide a remote control interface unit that may be used with a television set.

These and other objects of the present invention are achieved through a hand worn computer interface device comprising a fixed inner ring being of a dimension suitable to be worn on a portion of one of the fingers of the computer operator, a rotatable outer ring, the outer ring being concentric with the inner ring, and means for transmitting a plurality of cursor position control signals to the computer processor in response to the movement of the outer ring in relation to the inner ring.

More specifically, in the preferred embodiment of the invention, these objects are achieved through a computer interface system that is worn on the middle fingers of both hands of the computer operator. The system includes a left and right hand fixed inner ring, the inner rings being of a dimension suitable to be worn on a portion of the middle fingers of the computer operator's hands, and a left and a right rotatable outer ring. The left and right rotatable outer rings are concentric with the corresponding inner rings and are also worn on the middle fingers. The system also includes means for producing horizontal movement signals in response to the rotation of the left outer ring in relation to the left inner ring, means for producing vertical movement signals in response to the rotation of the right outer ring in relation to the right inner ring, and means for producing entry signals in response to the application of pressure on one of the outer rings toward the corresponding one of the inner rings.

These and other objects of the present invention will now become apparent from a review of the drawings and the following description of the preferred embodiments.

DETAILED DESCRIPTION OF THE PREFERRED EMBODIMENT

Figure 1:
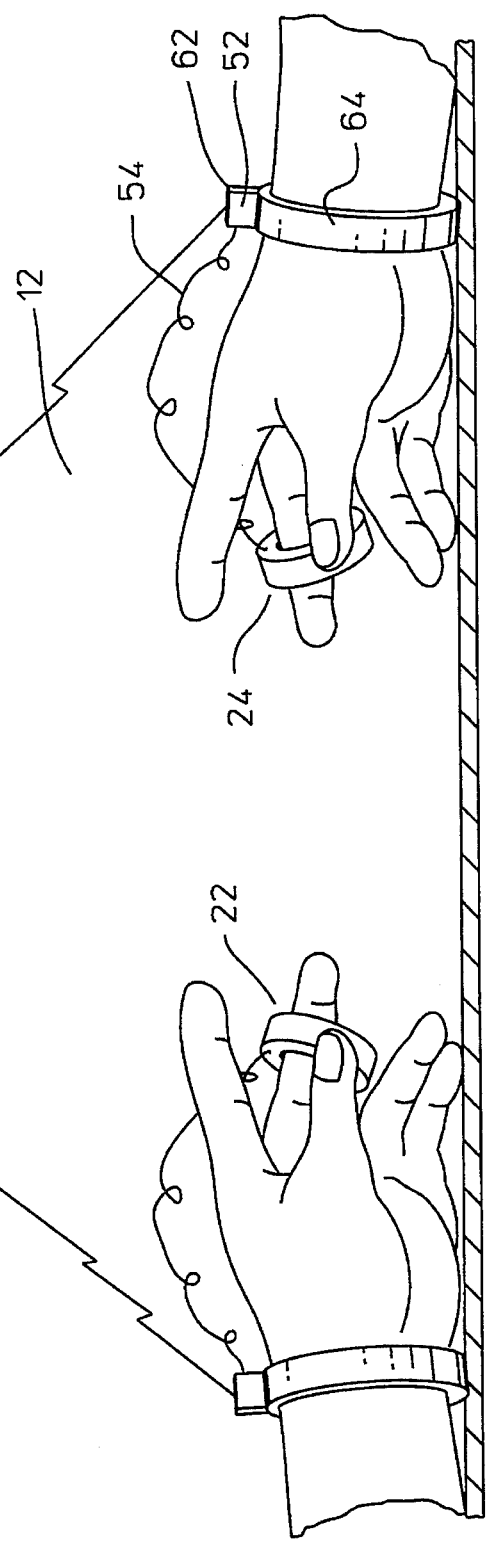
FIG. 1 is a perspective view of one embodiment of the hand worn computer interface device illustrating the principles of this invention.

Referring first to FIG. 1, a first embodiment of the hand worn remote computer interface device 12 is shown. The computer interface device 12 is shown in use with a computer monitor 14, a computer processor 16, and a computer keyboard 18. In the embodiment of the invention shown in FIG. 1, computer interface device 12 includes a first computer interface device 22 and a second computer interface device 24. The computer operator wears the first computer interface device 22 on the middle finger of the left hand, and the second computer interface device 24 on the middle finger of the right hand. In this embodiment, first computer interface device 22 controls horizontal movement of the cursor on computer monitor 14, while second computer interface device 24 controls vertical movement of the cursor on computer monitor 14. However, the directional control of each of the computer interface devices 22 and 24 can be changed according to what the computer operator prefers.

Figure 2:
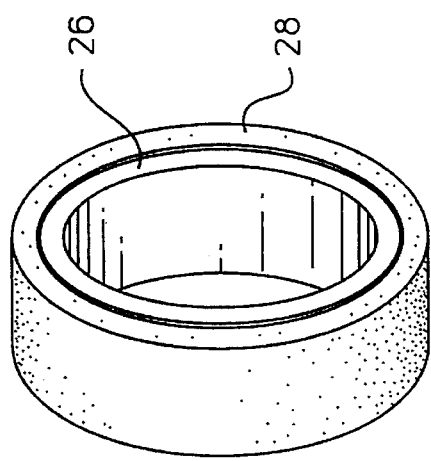
FIG. 2 is a perspective view of the concentric rings of one embodiment of the hand worn computer interface device of the present invention.
Figure 3:
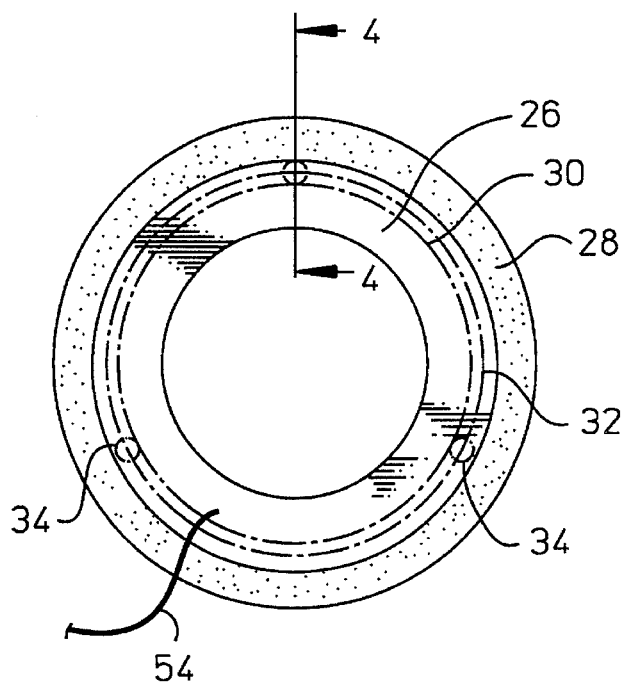
FIG. 3 is a top cross-sectional view of the concentric rings shown in FIG. 2.
Figure 4:
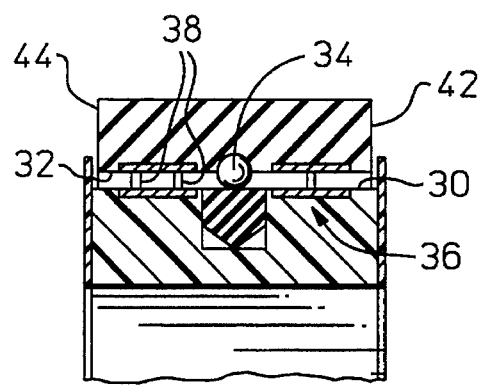
FIG. 4 is a partial side cross-sectional view of the concentric rings taken along line 4—4 of FIG. 3, showing the spaced-apart relationship between the inner and outer rings.

Referring now to FIGS. 2 and 3, the function of first and second computer interface devices 22 and 24 is described. Each of the computer interface devices 22 and 24 is comprised of an inner ring 26 and an outer ring 28. Inner ring 26 is preferably dimensioned so as to fit over a portion of the computer operator's middle finger. When worn on the computer operator's finger, inner ring 26 is slid over the finger tightly enough so as to be fixed and not able to rotate around the finger. Inner ring 26 further defines an outer surface 30, and outer ring 28 further defines an inner surface 32. Outer surface 30 is in a spaced-apart relationship to inner surface 32, with a plurality of ball bearings 34 (shown in FIGS. 3 and 4) maintaining the spaced-apart relationship. Therefore, outer ring 28 is concentric with inner ring 26 and rotates in relation to fixed inner ring 26. The system is designed such that when inner ring 26 is worn on the computer operator's middle finger, outer ring 28 is easily rotated by the thumb.

Figure 7:
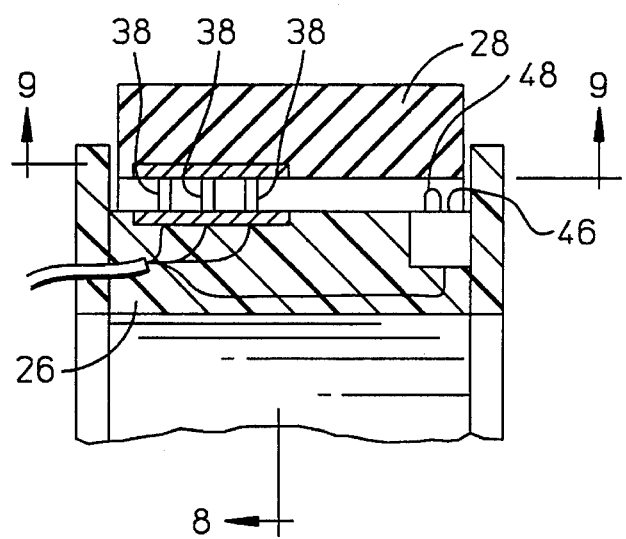
FIG. 7 is a partial side cross-sectional view of the concentric rings showing the sensing elements and microswitch of the computer interface control device.
Figure 8:
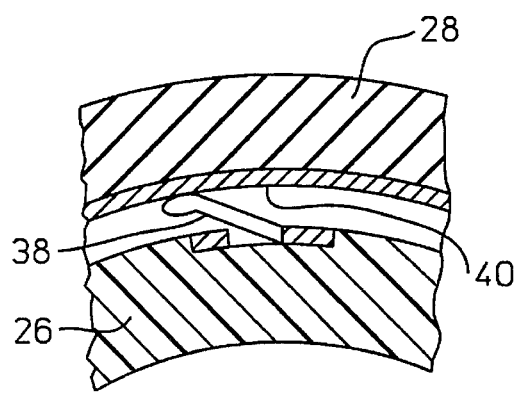
FIG. 8 is an enlarged partial top view showing the position of one of the sensing elements of the concentric rings, taken along line 8—8 of FIG. 7.

FIGS. 4, 7, 8 and 9 show a means 36 for transmitting a plurality of cursor position control signals to computer processor 16 in response to movement of outer ring 28 in relation to inner ring 26. In the preferred embodiment, electrical cursor position control signals are produced by a plurality of sensing elements 38 and a pattern of conductive material 40. As best shown in FIGS. 7 and 8, sensing elements 38 are attached to outer surface 30 of inner ring 26. In the embodiment shown, three sensing elements 38 are aligned from first edge 42 to outer edge 44 of outer surface 30 of inner ring 26.

Figure 9:
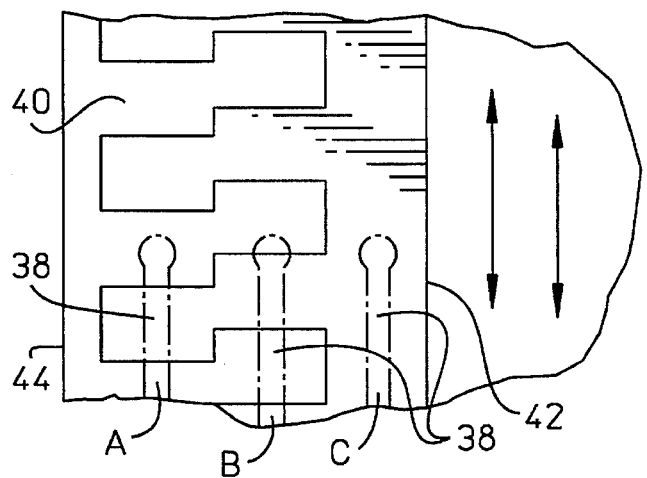
FIG. 9 is an enlarged partial view of the inner surface of the outer concentric ring, taken along line 9—9 of FIG. 7.

As best shown in FIG. 9, the conductive material is deposited in a predetermined pattern on inner surface 32 of outer ring 28 according to the desired cursor movement to be caused by rotation of outer ring 28 in relation to inner ring 26. Sensing elements 38 contact either a non-conductive portion or a conductive material portion of pattern 40 when outer ring 28 is rotated in relation to inner ring 26.

Referring now to FIG. 9, the function of the sensing elements and the conductive pattern is described more specifically. Three sensing elements A, B, and C, are shown in contact with either conductive or non-conductive portions of pattern 40. As outer ring 28 rotates in relation to inner ring 26, sensing element A opens and closes, depending on whether it is contacting a conductive portion of pattern 40 or a non-conductive portion of pattern 40. Sensing element C serves as a reference point for sensing element A, and does not contact the conductive portion of pattern 40. Therefore, each time sensing element A turns on, an electrical signal is sent to computer processor 16 that will advance the cursor in one direction, either horizontal or vertical.

Sensing element B is used to distinguish between clockwise and counter clockwise rotation of outer ring 28 in relation to inner ring 26. For example, with the conductive material pattern 40 shown in FIG. 9, if sensing element A switches from on to off while sensing element B is on, then the rotation is clockwise. However, if sensing element A switches from on to off while sensing element B is off, then the rotation is counter-clockwise. Therefore, the cursor control signals transmitted to computer processor 16 can distinguish between forward or backward movement of the cursor in the horizontal direction, and upward or downward movement of the cursor in the vertical direction.

Figure 11:
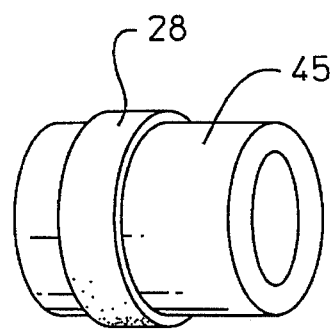
FIG. 11 is a perspective view of an alternate embodiment of the hand worn computer interface device of the present invention.

In an alternative embodiment of the invention shown in FIG. 11, only one computer interface device is worn on only one hand of the computer operator. In this embodiment, inner ring 26 is elongated so as to form an inner sleeve 45 worn on a portion of the computer operator's finger. Outer ring 28, however, is substantially thinner than inner sleeve 45, and can slide along the length of inner sleeve 45. The rotation of outer ring 28 in relation to inner sleeve 45 causes the cursor to move in the vertical direction. The sliding of outer ring 28 along the length of sleeve 45 causes the cursor to move in the horizontal direction. The design of sensing elements 38 and conductive material pattern 40 can vary the directional movement of the cursor caused by the movement of outer ring 28 in relation to inner sleeve 45.

Figure 12:
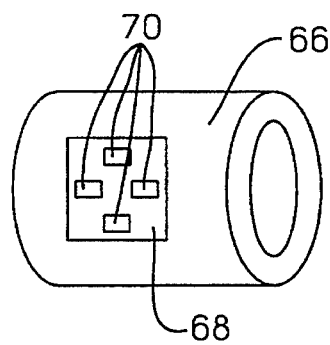
FIG. 12 is a perspective view of another alternate embodiment of the hand worn computer interface device of the present invention.

Referring now to FIG. 12, another alternate embodiment of the invention is shown. In this embodiment, the vertical and horizontal directional movement of the computer cursor is controlled by a single interface control device. The device also comprises an inner cylindrical sleeve 66 which the user wears over one finger. The inner sleeve 66 has a preferably square or rectangular module 68 mounted on the outer surface of the inner sleeve 66. The module 68 includes preferably four strain gauges or pressure sensors 70, with one of the pressure sensors 70 mounted along each side of module 68. The application of pressure on module 68 along any of the four sides of the module causes cursor movement in a corresponding direction.

Figure 10:
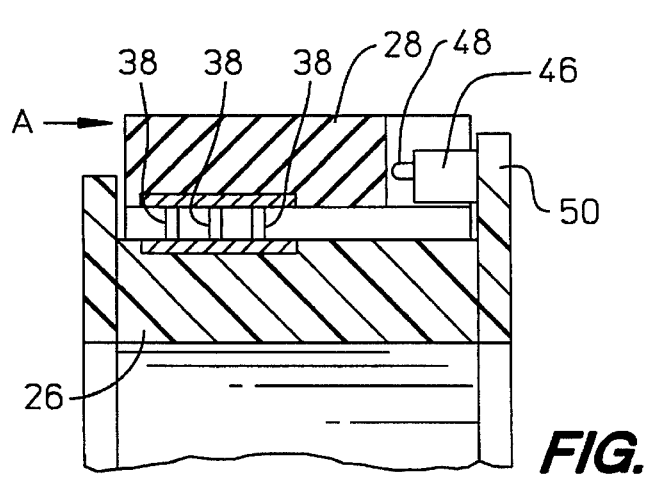
FIG. 10 is a partial side cross-sectional view of an alternate embodiment of the concentric rings.

Referring now to FIGS. 7 and 10, a pressure sensing element 46 is shown. Pressure sensing element 46 is used to transmit an entry signal to computer processor 16 once the cursor is in the desired location on computer monitor 14. In FIG. 7, pressure sensing element 46 is a microswitch mounted within inner ring 26, such that the pressure sensitive portion 48 of element 46 is located in the area between inner ring outer surface 30 and outer ring inner surface 32. Therefore, the application of pressure on outer ring 28 toward inner ring 26 causes the microswitch to close, and an entry signal to be sent to computer processor 16.

Regarding the alternate embodiment shown in FIG. 11, pressure sensing element 46 may be mounted on inner sleeve 45 such that the application of pressure on outer ring 28 causes the microswitch to close, and an entry signal to be sent to computer processor 16. Alternately, the pressure sensing element may be mounted on a separate inner ring and outer ring, which is worn on the user's opposite hand. Thus, one hand of the user controls the directional movement of the cursor, and the opposite hand controls entry signals to the computer processor. Regarding the alternative embodiment of the remote control device utilizing the square module and four sensing elements, the entry signals are preferably controlled by the user's opposite hand, where the pressure sensing element is mounted on a separate inner ring and outer ring, which is worn on the user's opposite hand.

In FIG. 10, an alternative embodiment of the pressure sensing element position in the computer interrace device 12 is shown. In this embodiment, pressure sensing element 46 is mounted on a ridge 50 formed on one of the edges 42, 44 of inner ring outer surface 30. In this embodiment, outer ring 28 is thinner than inner ring 26. The pressure sensitive portion 48 of element 46 is located between ridge 50 and outer ring 28, such that the application of pressure in the direction indicated as A on FIG. 10 closes pressure sensing element 46, causing an entry signal to be sent to computer processor 16.

In a different embodiment of the computer interface device 12, the device 12 may include a spring device between inner ring 26 and outer ring 28 for allowing non-linear movement of the cursor. The spring device detects the amount of pressure applied on outer ring 28 toward inner ring 26 when rotating outer ring in relation to inner ring 26. The movement of the cursor will then vary depending upon the amount of pressure applied. For example, if outer ring 28 is rotated with no pressure applied on outer ring 28 toward inner ring 26, the cursor will move in small increments on computer monitor 14. However, if outer ring 28 is rotated while applying a significant amount of pressure on outer ring 28 toward inner ring 26, the cursor will move in large increments on computer monitor 14.

In another alternate embodiment of the computer interface device, the design of conductive pattern 40 and sensing elements 38 allows movement of the cursor that is linear with velocity and acceleration. Therefore, the movement of the cursor is regulated by the velocity and acceleration of the outer ring in relation to the inner ring.

Figure 5:
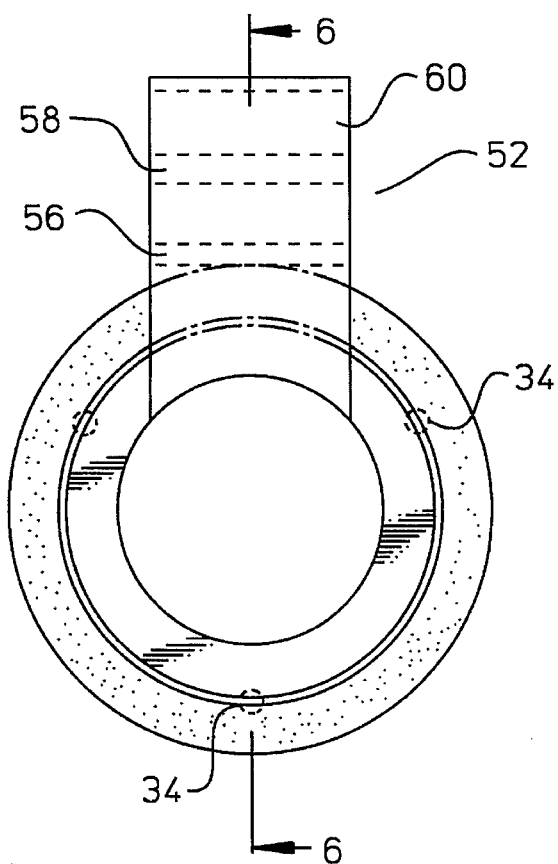
FIG. 5 is a top view of the concentric rings of one embodiment of the present invention with the electronics package of the computer interface device attached directly to the rings.
Figure 6:
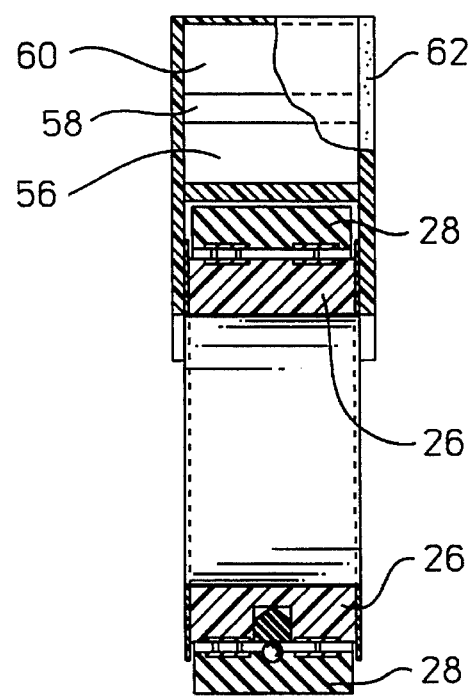
FIG. 6 is a side cross-sectional view of the concentric rings taken along line 6—6 of FIG. 5.

Referring now to FIGS. 1, 5 and 6, the remote operation feature of the present invention is described. As shown in FIG. 1, computer interface device 12 is operated remotely from computer processor 16. In the embodiment shown in FIG. 1, the electronics package 52 necessary for remote operation of computer interface device 12 is worn on the wrist of the computer operator. If electronics package 52 is worn on the wrist, a wire 54 is necessary to couple electronics package 52 to computer interface device 12, and a wrist support band 64 is used to support electronics package 52. This embodiment can also be slightly modified such that electronics package 52 is worn on a third ring worn on one of the computer operator's fingers. In the embodiment shown in FIG. 5, electronics package 52 is mounted directly to inner ring 26, and supported by the computer operator's finger.

In the preferred embodiment, electronics package 52 includes a microprocessor chip 56, a battery 58, and an infrared light wave emitter 60. Microprocessor chip 56, battery 58, and infrared light wave emitter 60 are preferably contained within a cylinder 62. Microprocessor chip 56 is the type known in the art and used for mouse-type devices. Infrared light wave emitter 60 transmits signals to computer processor 16 where the signals are received and decoded by a receiver in computer processor 16.

Having thus described exemplary embodiments of the present invention, it should be noted by those skilled in the art that the within disclosures are exemplary only and that various other alternatives, adaptations and modifications may be made within the scope of the invention. Thus, by way of example, but not of limitation, the remote computer interface device may be adapted for use to control other electrical devices, such as large screen televisions. Also the electronics package may be substituted with a cable for coupling the computer interface device to the computer processor. Moreover, the fixed inner ring and rotatable outer ring may be substituted by a variety of fixed surfaces and moveable surfaces that are both capable of being worn on the hands of the computer operator. It may also be desirable to provide decorative rings for use with the remote computer interface device. For example, the rings may be formed with precious metal and stones. Accordingly, it is to be understood that the present invention is not limited to the precise construction as shown in the drawings and described hereinabove.

I claim:

1. A hand worn computer interface device comprising:
   a fixed inner ring being of a dimension suitable to be worn on a portion of one of the fingers of a computer operator;
   a rotatable outer ring, said outer ring being concentric with said inner ring;
   means for generating a plurality of cursor position control signals in response to movement of said outer ring in relation to said inner ring; and
   means for transmitting said plurality of cursor position control signals to a computer processor.

2. A hand worn computer interface device in accordance with claim 1 further comprising means for transmitting an entry control signal to a computer processor in response to application of pressure on said outer ring toward said inner ring.

3. A hand worn computer interface device in accordance with claim 1 wherein said inner ring has a diameter suitable to fit over a portion of a computer operator's middle finger.

4. A hand worn computer interface device in accordance with claim 1 wherein said cursor position control signal generating means further comprises:
   a plurality of sensing elements attached to the outer surface of said inner ring;
   a pattern of conductive material disposed on the inner surface of said outer ring; and
   means for generating cursor position control signals in response to the contact of said sensing elements with said pattern of conductive material.

5. A hand worn computer interface device in accordance with claim 2 wherein said entry control signal transmitting means comprises a pressure sensing element mounted on a selected one of said inner and outer rings, wherein the application of pressure to said sensing element causes the transmission of said entry control signal.

6. A hand worn computer interface device in accordance with claim 1 further comprising a plurality of ball bearings disposed between said inner and outer rings for allowing rotation of said outer ring in relation to said inner ring.

7. A hand worn computer interface device in accordance with claim 1 wherein said cursor position control signal transmitting means comprises:

an infrared light wave transmitter coupled to said rings for transmitting said cursor position control signals in infrared light wave form; and a receiver associated with the computer processor for receiving said infrared light waves.

8. A hand worn computer interface device in accordance with claim 7 further comprising a small cylinder for containing said infrared light wave transmitter, wherein said small cylinder is mounted on a ring to be worn on a portion of the computer operator's hand.

9. A hand worn computer interface device in accordance with claim 7 further comprising a small cylinder for containing said infrared light wave transmitter, wherein said small cylinder is mounted directly to said inner ring.

10. A computer interface device worn on a single finger of a computer operator, comprising:

a fixed inner cylindrical sleeve having a first depth, said fixed sleeve worn on a single finger of a computer operator;

a moveable outer sleeve having a second depth, said moveable sleeve being concentric with said fixed sleeve, the second depth being less than the first depth;

means for generating a plurality of cursor position control signals in response to sliding movement of said moveable sleeve along said fixed sleeve;

an infrared light wave transmitter for remotely transmitting said cursor position control signals in infrared light wave form to a computer processor; and a receiver associated with the computer processor for receiving said infrared light waves.

11. A computer interface device in accordance with claim 10 further comprising means for generating an entry control signal to the computer processor in response to the application of pressure on one of said moveable and fixed sleeves toward the opposite sleeve.

12. A computer interface device in accordance with claim 10 wherein said cursor position control signal generating means comprises:

a plurality of sensing elements attached to a first surface on said fixed sleeve;

a pattern of conductive material disposed on a second surface on said moveable sleeve, wherein said first surface and said second surface are in a spaced-apart relationship; and means for generating said cursor position control signals in response to the contact of said sensing elements with said pattern of conductive material.

13. A computer interface device in accordance with claim 11 wherein said entry control signal transmitting means comprises:

a pressure sensing element mounted on one of said sleeves in a location such that it is activated by pressure on said one of said sleeves.

14. A computer interface device in accordance with claim 10 further comprising a plurality of ball bearings disposed between said fixed sleeve and said moveable sleeve for allowing movement of said moveable sleeve in relation to said fixed sleeve.

15. A computer interface device in accordance with claim 10 wherein the second depth is substantially smaller than the first depth.

16. A computer interface device in accordance with claim 10 further comprising a small cylinder for containing said infrared light wave transmitter, wherein said small cylinder is mounted on a ring to be worn on a portion of the computer operator's hand.

17. A computer interface device in accordance with claim 10 further comprising a small cylinder for containing said infrared light wave transmitter, wherein said small cylinder is mounted directly on said fixed sleeve.

18. A computer interface system that is worn on the hands of a computer operator comprising:

a first fixed inner ring, said first inner ring being of a dimension suitable to be worn on a portion of one of the computer operator's fingers;

a first rotatable outer ring;

means for producing horizontal cursor movement signals in response to the rotation of said first outer ring in relation to said first inner ring;

a second fixed inner ring, said second inner ring being of a dimension suitable to be worn on a portion of one of the computer operator's fingers;

a second rotatable outer ring;

means for producing vertical cursor movement signals in response to the rotation of said second outer ring in relation to said second inner ring; and means for producing entry control signals in response to the application of pressure on one of said outer rings toward the corresponding said inner ring.

19. A hand worn computer interface device in accordance with claim 18 further comprising:

an infrared light wave transmitter coupled to said rings for transmitting said cursor position control signals and said entry control signals to the computer processor in infrared light wave form; and a receiver associated with the computer processor for receiving said infrared light waves.

* * * * *